(12) United States Patent
Whalen

(10) Patent No.: US 7,831,979 B2
(45) Date of Patent: Nov. 9, 2010

(54) PROCESSOR WITH INSTRUCTION-BASED INTERRUPT HANDLING

(75) Inventor: Shaun P. Whalen, Wescosville, PA (US)

(73) Assignee: Agere Systems Inc., Allentown, PA (US)

( * ) Notice: Subject to any disclaimer, the term of this patent is extended or adjusted under 35 U.S.C. 154(b) by 1929 days.

(21) Appl. No.: 10/833,560

(22) Filed: Apr. 28, 2004

(65) Prior Publication Data

US 2005/0257224 A1 Nov. 17, 2005

(51) Int. Cl.
*G06F 9/46* (2006.01)

(52) U.S. Cl. .................................... 718/108
(58) Field of Classification Search .................. 718/108
See application file for complete search history.

(56) References Cited

U.S. PATENT DOCUMENTS

| | | | |
|---|---|---|---|
| 4,910,663 A | 3/1990 | Bailey | |
| 5,182,811 A | 1/1993 | Sakamura | |
| 5,218,703 A * | 6/1993 | Fleck et al. | 710/264 |
| 5,701,495 A * | 12/1997 | Arndt et al. | 710/263 |
| 5,815,696 A | 9/1998 | Tanaka et al. | |
| 5,822,578 A | 10/1998 | Frank et al. | |
| 5,931,934 A | 8/1999 | Li et al. | |
| 6,029,222 A | 2/2000 | Kamiya | |
| 6,070,220 A * | 5/2000 | Katayama | 710/264 |
| 6,169,929 B1 * | 1/2001 | Izzo et al. | 700/18 |
| 6,253,338 B1 | 6/2001 | Smolders | |
| 6,535,943 B1 | 3/2003 | Hatamori et al. | |
| 6,553,513 B1 * | 4/2003 | Swoboda et al. | 714/28 |
| 6,662,297 B1 | 12/2003 | Boom et al. | |

* cited by examiner

*Primary Examiner*—Meng-Ai An
*Assistant Examiner*—Mengyao Zhe
(74) *Attorney, Agent, or Firm*—Ryan, Mason & Lewis, LLP

(57) ABSTRACT

A processor comprises memory circuitry and processing circuitry coupled to the memory circuitry. The processing circuitry is operative to retrieve from the memory circuitry an interrupt polling instruction which causes selection of an active enabled interrupt and generation of an interrupt vector for the selected active enabled interrupt. In conjunction with the selection and generation operations, an execution context of a program thread is stored in the memory circuitry, the stored execution context being utilizable to resume the program thread at an appropriate time subsequent to interruption of that thread.

22 Claims, 2 Drawing Sheets

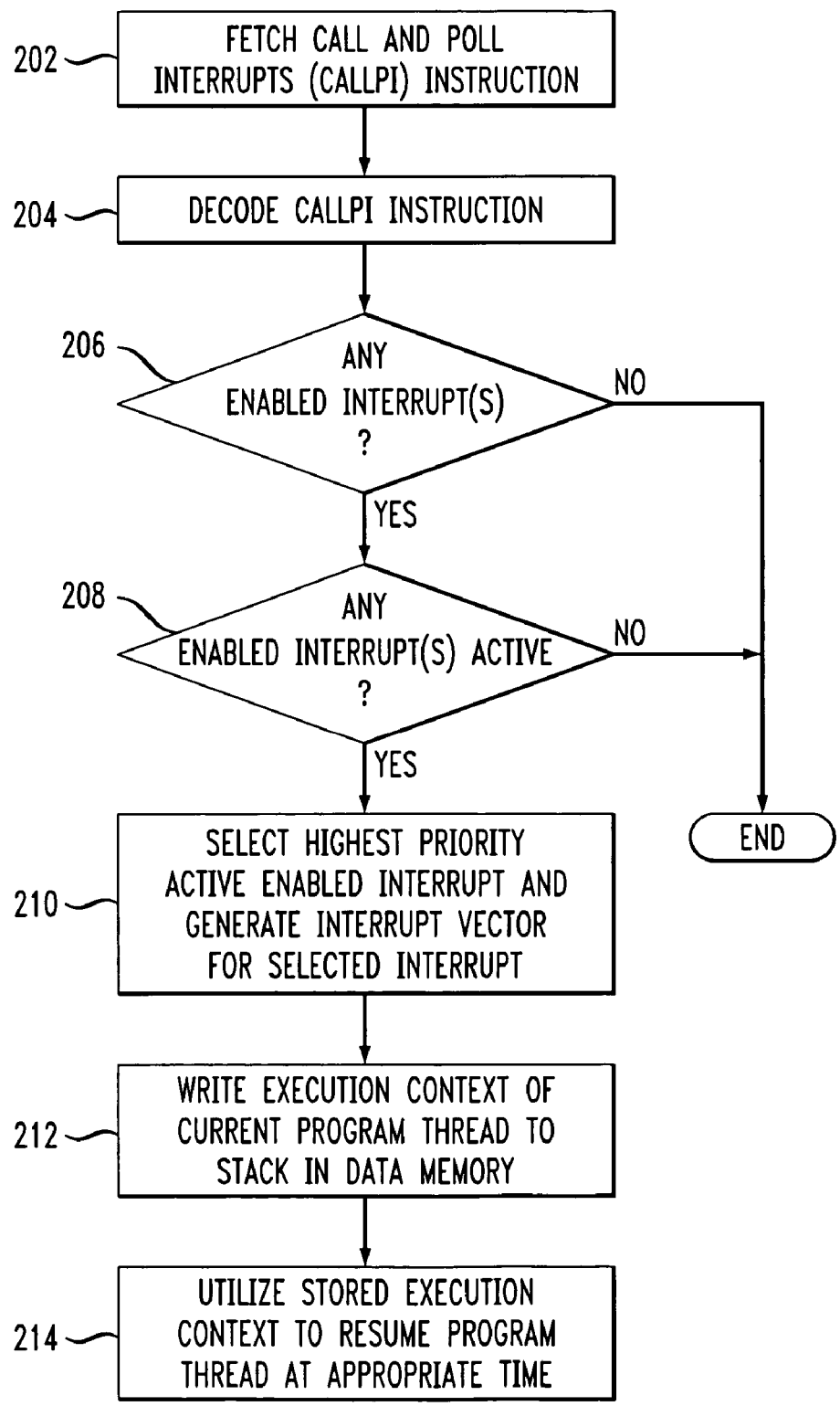

PROCESSOR WITH INSTRUCTION-BASED INTERRUPT HANDLING

FIELD OF THE INVENTION

The present invention relates generally to microcontrollers, digital signal processors (DSPs), microprocessors and other types of digital data processors, and more particularly to digital data processors which include an interrupt handling capability.

BACKGROUND OF THE INVENTION

Modern digital data processors are often pipelined, meaning that execution of each instruction is divided into several stages. Such stages may include, by way of example, a fetch stage, a decode stage, an execute stage, and a writeback stage. The execute stage may comprise multiple specialized execution units, such as multipliers, adders or dividers, for performing integer or floating point arithmetic operations.

It is often desirable for a real-time application, running on a pipelined digital data processor or other type of digital data processor, to execute its software in a deterministic manner. However, interrupts can occur at unexpected times to change the flow of software execution. If an application has time-critical tasks that must execute before a given deadline, either the interrupts must be disabled and then reenabled, or complex analysis must be performed to determine if the deadline can be met despite the interrupts.

Interrupts for a central processing unit (CPU) in a pipelined digital data processor are typically processed using a state machine that controls the pipeline to redirect execution to an interrupt handler in response to designated events. The interrupt handler is usually implemented in software.

As indicated previously, one typical conventional mechanism for managing interrupts is through enabling or disabling the interrupts. This capability may be implemented with CPU instructions or through toggling control register bits in an interrupt controller, in conjunction with utilization of the above-noted state machine.

A problem with this approach is that the state machine used to implement the interrupt function adds significant complexity to the processor pipeline. The pipeline must be designed to accept commands from the state machine rather than from an operational, non-interrupt instruction fetch path. The state machine may interrupt the pipeline in any state. Thus, it must preserve several program counters to allow the pipeline to be restarted at the point of the interrupt. This requires additional logic circuitry in the processor, as well as additional development time for functional verification, both of which increase processor cost.

Another problem relates to the fact that the CPU instructions that enable or disable interrupts typically change a control bit in a CPU control or status register. As a result, the enabling of interrupts usually takes at least one clock cycle, and the disabling of interrupts also takes at least one clock cycle. These two cycles increase the overhead for handling an interrupt, especially for the case of short interrupt routines. Although pipelined processors often handle read and write hazards for frequently-used general-purpose registers, hazards for accesses to control or status registers are not typically handled. Thus, it is the responsibility of the application software programmer to schedule any such interrupt enabling or disabling instructions with others that may be in the pipeline at the same time.

It is also possible to use a real-time operating system (RTOS) to schedule processing tasks associated with real-time applications. The RTOS handles dispatching tasks and implements other services to ensure that deadlines for time-critical tasks are met. However, using an RTOS to enforce deterministic software execution typically requires a processor of substantial size, cost and complexity. The use of an RTOS to provide deterministic execution in applications involving simple software architectures therefore leads to unnecessary increases in implementation expense and performance overhead.

Accordingly, a need exists for improved techniques for handling interrupts in a pipelined processor or other type of processor.

SUMMARY OF THE INVENTION

The present invention meets the above-identified need by providing, in accordance with one aspect thereof, a processor capable of executing an interrupt polling instruction in a normal instruction flow. The processor comprises memory circuitry and processing circuitry coupled to the memory circuitry. The processing circuitry is operative to retrieve the interrupt polling instruction from the memory circuitry. The interrupt polling instruction causes selection of an active enabled interrupt and generation of an interrupt vector for the selected active enabled interrupt. In conjunction with the selection and generation operations, an execution context of a program thread is stored in the memory circuitry. The stored execution context is utilizable to resume the program thread at an appropriate time, such as subsequent to completion of the handling of the selected active enabled interrupt.

The generation of an interrupt vector for the selected active enabled interrupt, responsive to decoding of the interrupt polling instruction, preferably results in transfer of program execution to an interrupt handler identified at least in part by the interrupt vector. Advantageously, the transfer of program execution to the interrupt handler occurs without the need for any interrupt enabling instruction and without the need for any interrupt disabling instruction.

In accordance with another aspect of the invention, the processor further comprises an instruction decoder, an interrupt controller coupled to the instruction decoder, and at least one multiplexer. The instruction decoder is operative to decode the interrupt polling instruction, and the interrupt controller is operative to generate the interrupt vector. The instruction decoder is further operative to control the multiplexer such that the interrupt vector is selected as a next instruction address to be fetched from an instruction memory of the memory circuitry. The corresponding returned instruction may comprise a first instruction of an interrupt handler for the selected active enabled interrupt.

BRIEF DESCRIPTION OF THE DRAWINGS

FIG. 2 is a flow diagram of an interrupt handling process implemented in the processor of FIG. 1 in accordance with the invention.

DETAILED DESCRIPTION OF THE INVENTION

Figure 1:
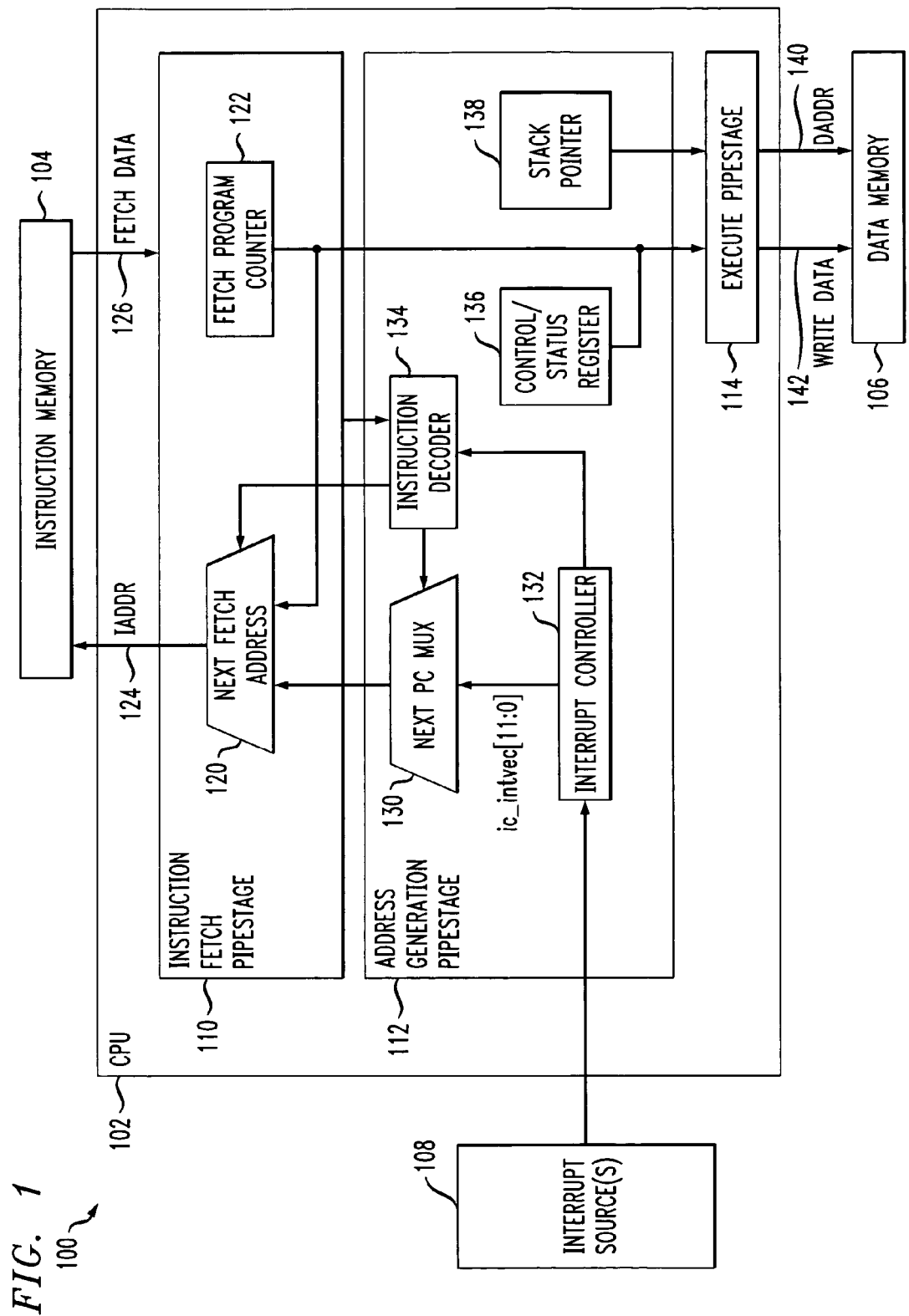
FIG. 1 is a block diagram of a processor in accordance with an illustrative embodiment of the invention.

The invention will be illustrated below in conjunction with an exemplary implementation of a pipelined processor. It should be understood, however, that the invention is more generally applicable to any digital data processor in which it is desirable to provide enhanced efficiency and flexibility in the handling of interrupts. The term "processor" as used herein is intended to include any device in which instructions retrieved from a memory or other storage element are executed using one or more execution units. Exemplary processors in accordance with the invention may therefore include, for example, microcontrollers, digital signal processors (DSPs), microprocessors, application-specific integrated circuits (ASICs), and computers, as well as other types of data processing devices. A given processor, or a particular portion thereof, may be implemented in the form of one or more integrated circuits.

FIG. 1 shows a pipelined processor 100 in accordance with an illustrative embodiment of the invention. The processor 100 includes a central processing unit (CPU) 102 coupled to an instruction memory 104 and a data memory 106. As will be described in greater detail below, the CPU 102 processes interrupts received from one or more interrupt sources 108, utilizing a call and poll interrupts (CALLPI) instruction. The CALLPI instruction is an illustrative example of what is more generally referred to herein as an interrupt polling instruction. Alternative embodiments of the invention may utilize other types of interrupt polling instructions than the exemplary CALLPI instruction.

In the illustrative embodiment, a given CALLPI instruction, when retrieved from instruction memory 104 and decoded in the CPU 102, causes selection of an active enabled interrupt and generation of an interrupt vector for the selected active enabled interrupt. Additionally, in conjunction with the selection and generation operations, an execution context of a program thread is stored in memory circuitry. The stored execution context may be utilized to resume the program thread at an appropriate time subsequent to interruption of that thread. Advantageously, the CALLPI instruction allows multiple interrupt sources to be tested or otherwise polled, and a particular interrupt selected for further processing, in a manner that avoids the problems associated with the conventional techniques described previously.

The CPU 102 is an example of what is more generally referred to herein as "processing circuitry." This term is also intended to include, by way of example, a portion of a CPU such as CPU 102 or other digital data processor element, or combinations of multiple such digital data processor elements.

The instruction memory 104 and data memory 106 are examples of what is more generally referred to herein as "memory circuitry." Memory circuitry, as the term is used herein, may refer to an instruction memory, a data memory, or both, as well as portions or combinations of these and other storage elements. Memory circuitry may be internal to the processing circuitry, external to the processing circuitry, or partially internal and partially external, as required to satisfy the needs of a given embodiment.

It is to be appreciated that the invention can be implemented using a wide variety of other types and configurations of processing circuitry and memory circuitry.

The processor 100 as shown in the figure may be viewed as comprising a single integrated circuit or multiple integrated circuits.

As indicated above, the processor 100 in the illustrative embodiment is a pipelined processor, and includes a plurality of pipeline stages, also referred to herein as "pipestages." More specifically, the CPU 102 includes a fetch stage denoted as instruction fetch pipestage 110, a decode stage denoted as address generation pipestage 112, and an execute stage denoted as execute pipestage 114. Of course, the present invention does not require any particular type of pipeline configuration, and other embodiments may include more or fewer pipestages. For example, another embodiment may include a separate writeback stage. In the illustrative embodiment of FIG. 1; it is assumed that writeback functionality is implemented in the execute pipestage 114.

The instruction fetch pipestage 110 includes a next fetch address multiplexer 120 and a fetch program counter 122. An instruction address (IADDR) is supplied by the multiplexer 120 of the instruction fetch pipestage 110 to the instruction memory 104 via an IADDR bus 124, and the corresponding fetched instruction data is returned from the instruction memory 104 to the instruction fetch pipestage 110 via a fetch data bus 126.

The address generation pipestage 112 includes a next program counter multiplexer 130, an interrupt controller 132, an instruction decoder 134, a control/status register 136, and a stack pointer 138. The term "control/status" as used herein should be understood to include control only, status only, or a combination of control and status. The interrupt controller 132 receives interrupts from the interrupt source(s) 108 for processing in the CPU 102, and performs functions associated with prioritization and selection of active interrupts, as will be described in conjunction with the flow diagram of FIG. 2.

Although not shown in FIG. 1, an additional interrupt controller, of a conventional type, may be included in the processor 100 external to the CPU 102. Such a conventional external interrupt controller may be modified in a straightforward manner to operate in conjunction with the interrupt controller 132 that is internal to the CPU 102. It should be noted that, in alternative embodiments, the functionality associated with interrupt controller 132 may be implemented at least in part external to the CPU 102, for example, in an otherwise conventional interrupt handler within the processor 100.

Information from the fetch program counter 122 of the instruction fetch pipestage 110, and from the control/status register 136 and stack pointer 138 of the address generation pipestage 112, is made available to the execute pipestage 114.

The address generation pipestage 112 computes data addresses for data memory accesses. The execute pipestage 114 transfers a given data address (DADDR) over a DADDR bus 140 and the corresponding write data to the data memory 106 over a write data bus 142.

The execute pipestage 114 writes data to the data memory 106 at a location indicated by a data address supplied via the DADDR bus 140.

The processor 100 may include additional elements not explicitly shown, but of a type typically found in a conventional implementation of such a processor. For example, as noted above, the processor may include a separate interrupt controller external to the CPU 102. Such additional elements, being of a type well known to those skilled in the art, will not be described in detail herein.

In operation, instruction fetch pipestage 110 fetches an instruction from the instruction memory 104, and the fetched instruction is decoded by the instruction decoder 134 in the address generation pipestage 112. For a change in instruction execution flow, the address generation pipestage 112 launches a new program counter address to the instruction fetch pipestage 110, via the multiplexer 130.

The above-noted CALLPI instruction in the illustrative embodiment may be viewed as performing at least two distinct functions, namely, a test or other polling of the active enabled interrupt sources and the generation of a function call to the corresponding interrupt handler for the highest priority interrupt. A CALLPI instruction is fetched from the instruction memory 104 by the instruction fetch pipestage 110 in the same way as other instructions.

The instruction decoder 134 decodes the CALLPI instruction by using its connection to the interrupt controller 132 to determine the highest priority interrupt or the absence of any active enabled interrupts. If no interrupts are enabled and active, the CALLPI instruction does not change the instruction fetch stream or the execution context. If one or more enabled interrupts are active, the interrupt controller 132 prioritizes them and generates an interrupt vector, denoted by way of example in FIG. 1 as a 12-bit interrupt vector ic_intvec [11:0], for the corresponding interrupt handler. The use of a 12-bit value is purely by way of example, and other interrupt vector formats may be used.

The interrupt handler is generally implemented in software comprising one or more instructions which may be stored in the instruction memory 104. The instruction decoder 134 controls the next program counter multiplexer 130 and the next fetch address multiplexer 120 such that the interrupt vector ic_intvec[11:0] is selected as the next instruction address to be fetched from the instruction memory 104. The instruction data returned by this fetch is the first instruction of the interrupt handler for the highest priority active enabled interrupt.

The CALLPI instruction also causes the execution context of the current program thread to be written to the stack in data memory, as is done for a function call. The execution context of the current program thread may include, by way of example, a next fetch address and current control/status information. The data memory address to be written is indicated by the stack pointer 138. The write data to be written in this embodiment more specifically includes the current value of the fetch program counter 122, which is the instruction address that would have been fetched if no active enabled interrupt were present, and the current contents of the control/status register 136. The stored execution content of the interrupted program thread is stored on a stack in data memory 106, and may be used as needed to later resume that program thread. The program thread may be the single thread of a single-threaded processor, or one of a plurality of threads of a multi-threaded processor.

The flow diagram 200 of FIG. 2 shows an example of the interrupt handling process for a given CALLPI instruction in the illustrative embodiment.

In step 202, the given CALLPI instruction is fetched from the instruction memory 104 in the manner previously described.

In step 204, the given CALLPI instruction is decoded.

Steps 206 and 208 determine if there are any active enabled interrupts. If not, the processing of the given CALLPI is complete. If there is at least one active enabled interrupt, the process moves to step 210.

Although steps 206 and 208 are shown in FIG. 2 as being performed subsequent to the decoding of the CALLPI instruction, it is also possible in an alternative embodiment to configure the FIG. 2 process such that steps 206 and 208 are performed concurrently with the decoding of the CALLPI instruction. For example, steps 206 and 208 may be part of a process, performed by the interrupt controller 132, that executes concurrently with the decoding step 204 as performed by the instruction decoder 134. Numerous other alternative configurations are possible, as will be appreciated by those skilled in the art.

In step 210, the highest priority active interrupt is selected, and an interrupt vector is generated for the selected interrupt. If there is only a single active enabled interrupt, that interrupt is selected as the highest priority interrupt. If there are multiple active enabled interrupts, the highest priority interrupt is selected in this embodiment. Other types of prioritization or interrupt selection mechanisms may be used in alternative embodiments.

As indicated previously, the generation of an interrupt vector transfers control to an interrupt handler which is implemented in software comprising one or more instructions which may be stored in the instruction memory 104.

In step 212, the execution context of the current program thread is written to a stack in the data memory 106, in the manner previously described.

In step 214, the stored execution context is utilized to resume the interrupted program thread at an appropriate time, for example, at the completion of the processing of the selected highest priority interrupt.

The process illustrated in FIG. 2 for a single CALLPI instruction may be repeated for each CALLPI instruction in a given program or other set of instruction code.

The illustrative embodiment of the invention as described above in conjunction with FIGS. 1 and 2 provides a number of significant advantages over conventional arrangements.

For example, the processor pipeline is considerably simplified because the conventional interrupt state machine, and the additional program counters and logic that it requires, are eliminated. Instead, transfer of program execution to an interrupt handler occurs in the normal instruction flow, responsive to decoding of a CALLPI instruction.

The overhead associated with enabling and disabling of interrupts is also eliminated. A given program executing in the processor 100 does not need to explicitly enable and disable interrupts in order to transfer to an interrupt handler. Moreover, the programming complexity attributable to scheduling of interrupt enabling or disabling instructions is avoided, since the CALLPI instruction does not disturb the normal instruction flow.

The invention in the illustrative embodiment advantageously makes interrupt management more deterministic. A programmer can control explicitly when a transfer to an interrupt handler is allowed to take place. For example, if a program contains a critical code section that cannot be interrupted, the programmer simply schedules the CALLPI instruction as required by coding it before or after the critical section.

Yet another advantage of the illustrative embodiment is that it provides deterministic execution in real-time applications without the additional size, cost and complexity associated with use of an RTOS. Thus, the invention is particularly well suited for use in real-time applications involving simple software architectures.

It should again be emphasized that the embodiments of the present invention as described above are presented by way of illustrative example only. Alternative embodiments of the invention may be configured utilizing different arrangements of memory circuitry and processing circuitry, and different interrupt polling instruction configurations and interrupt handling processes, than those explicitly described above. These and numerous other alternative embodiments within the scope of the following claims will be readily apparent to those skilled in the art.

What is claimed is:

1. A processor comprising:
   memory circuitry; and
   processing circuitry coupled to the memory circuitry;
   the processing circuitry being operative to retrieve from the memory circuitry an interrupt polling instruction;
   the interrupt polling instruction causing:
      polling of one or more interrupt sources to detect a presence of one or more active enabled interrupts; and responsive to the detected presence of one or more active enabled interrupts:
    selection of an active enabled interrupt from the one or more active enabled interrupts; and
    generation of an interrupt vector for the selected active enabled interrupt;
wherein in conjunction with the selection and generation operations an execution context of a program thread is stored in the memory circuitry, the stored execution context being utilizable to resume the program thread subsequent to interruption of that thread; and
wherein the processor further comprises:
    an instruction decoder;
    an interrupt controller coupled to the instruction decoder; and
    at least one multiplexer;
the instruction decoder being operative to decode the interrupt polling instruction;
the interrupt controller being operative to generate the interrupt vector;
the instruction decoder being operative to control the at least one multiplexer such that the interrupt vector is selected as a next instruction address to be fetched from an instruction memory of the memory circuitry, a corresponding returned instruction comprising an instruction of an interrupt handler for the selected active enabled interrupt.

2. The processor of claim 1 wherein the interrupt polling instruction comprises a call and poll interrupts instruction.

3. The processor of claim 1 wherein the memory circuitry comprises at least a portion of an instruction memory and at least a portion of a data memory.

4. The processor of claim 3 wherein the interrupt polling instruction is retrieved from the instruction memory.

5. The processor of claim 3 wherein the execution context is stored in a stack implemented in the data memory.

6. The processor of claim 1 wherein the selection operation selects a highest priority interrupt from among a plurality of active enabled interrupts.

7. The processor of claim 1 wherein the processing circuitry comprises a central processing unit.

8. The processor of claim 1 wherein the processor comprises a pipelined processor.

9. The processor of claim 8 wherein the processing circuitry comprises a plurality of pipeline stages, including at least a fetch stage, a decode stage and an execute stage.

10. The processor of claim 9 wherein the decode stage comprises an address generation stage, the address generation stage comprising an instruction decoder, an interrupt controller, and at least one multiplexer, the interrupt controller being operative to generate a selectable input to the multiplexer, the instruction decoder being operative to control a selection function of the multiplexer.

11. The processor of claim 1 wherein the interrupt polling instruction is one of a plurality of instructions processed in a normal instruction flow of the processor.

12. The processor of claim 1 wherein the generation of an interrupt vector for the selected active enabled interrupt, responsive to decoding of the interrupt polling instruction, results in transfer of program execution to an interrupt handler identified at least in part by the interrupt vector.

13. The processor of claim 12 wherein the transfer of program execution to the interrupt handler occurs without the need for any interrupt enabling instruction and without the need for any interrupt disabling instruction.

14. The processor of claim 1 wherein the processor is implemented in the form of an integrated circuit.

15. A method for handling interrupts in a processor comprising memory circuitry and processing circuitry coupled to the memory circuitry, the method comprising the steps of:
    retrieving from the memory circuitry an interrupt polling instruction; and
    decoding the interrupt polling instruction;
    the interrupt polling instruction causing:
        polling of one or more interrupt sources to detect a presence of one or more active enabled interrupts; and
        responsive to the detected presence of one or more active enabled interrupts:
            selection of an active enabled interrupt from the one or more active enabled interrupts;
            generation of an interrupt vector for the selected active enabled interrupt; and
            control of at least one multiplexer such that the interrupt vector is selected as a next instruction address to be fetched from an instruction memory of the memory circuitry, a corresponding returned instruction comprising an instruction of an interrupt handler for the selected active enabled interrupt;
    wherein in conjunction with the selection and generation operations an execution context of a program thread is stored in the memory circuitry, the stored execution context being utilizable to resume the program thread subsequent to interruption of that thread.

16. The method of claim 15 wherein a determination is made subsequent to the decoding step as to whether there are any active enabled interrupts.

17. The method of claim 15 wherein a determination is made concurrently with the decoding step as to whether there are any active enabled interrupts.

18. An integrated circuit comprising:
    at least one processor comprising memory circuitry and processing circuitry coupled to the memory circuitry;
    the processing circuitry being operative to retrieve from the memory circuitry an interrupt polling instruction;
    the interrupt polling instruction causing:
        polling of one or more interrupt sources to detect a presence of one or more active enabled interrupts; and
        responsive to the detected presence of one or more active enabled interrupts;
            selection of an active enabled interrupt from the one or more active enabled interrupts; and
            generation of an interrupt vector for the selected active enabled interrupt;
    wherein in conjunction with the selection and generation operations an execution context of a program thread is stored in the memory circuitry, the stored execution context being utilizable to resume the program thread subsequent to interruption of that thread; and
    wherein the processor further comprises:
        an instruction decoder;
        an interrupt controller coupled to the instruction decoder; and
        at least one multiplexer;
    the instruction decoder being operative to decode the interrupt polling instruction;
    the interrupt controller being operative to generate the interrupt vector;
    the instruction decoder being operative to control the at least one multiplexer such that the interrupt vector is selected as a next instruction address to be fetched from an instruction memory of the memory circuitry, a corresponding returned instruction comprising an instruction of an interrupt handler for the selected active enabled interrupt.

19. The processor of claim 1, wherein the stored execution context comprises a current value of a fetch program counter of the program thread, and wherein the interrupt polling instruction causes the storing of the execution context.

20. The processor of claim 1, wherein the interrupt processor instruction causes generation of a function call to an interrupt handler.

21. The processor of claim 11, wherein the normal instruction flow comprises:

fetching the interrupt polling instruction by a fetch pipestage of the processor from instruction memory; and decoding of the fetched interrupt polling instruction by an instruction decoder.

22. The processor of claim 13, wherein control of when the transfer of program execution to the interrupt handler occurs is associated with placement of the interrupt polling instruction with respect to other program code.

* * * * *